Patented Jan. 19, 1932

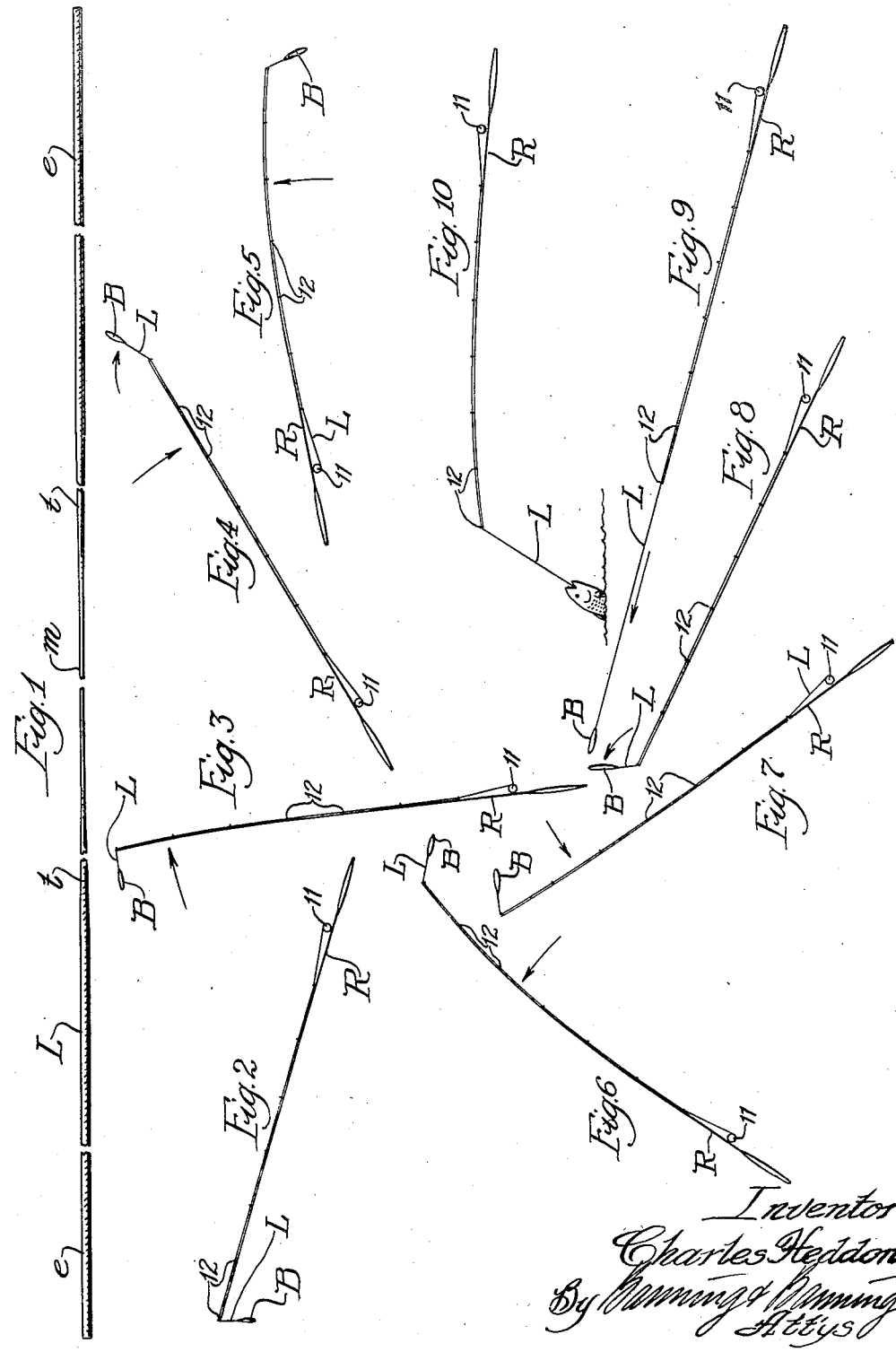

1,842,169

UNITED STATES PATENT OFFICE

CHARLES HEDDON, OF DOWAGIAC, MICHIGAN, ASSIGNOR TO JAMES HEDDON'S SONS, OF DOWAGIAC, MICHIGAN, A CORPORATION OF MICHIGAN

FISHING LINE

Application filed January 12, 1931. Serial No. 508,040.

This invention which relates to a fishing line is concerned more particularly with a line used in casting, the principal object being to impart added strength to the line at the point where the greatest friction and consequent wear occurs, all without increasing the difficulties in casting, thereby prolonging its serviceability and decreasing likelihood of breakage. As the description proceeds hereinafter other advantages, aims, and purposes will appear also.

In order that my invention may be better understood and appreciated, I have illustrated in the accompanying drawings certain figures in which is depicted—

Figure 1, a view in elevation of my improved fishing line with indicated breaks to shorten its length, the relative diameters of its various portions, and the tapered connecting sections being grossly exaggerated;

Figs. 2 to 5, diagrammatic figures showing various positions through which a casting rod and associated line are moved on the back stroke;

Figs. 6 to 9, diagrammatic figures showing various positions through which the rod and its line are moved on the forward or casting stroke;

Fig. 10, a diagrammatic figure showing the rod and line in the position often assumed after the catch has been drawn up close.

Preliminary to an exposition of the features of improvement which characterize my invention, it will be useful to review some of the conditions encountered by a fishing line that is used in casting operations. It is quite the usual practice to attach one end of the line L to a reel 11 upon which is wound substantially all the line in excess of that actually projected from the rod R. The line is threaded through guides 12, one of which is relatively close to the free end of the rod. Attached to the free end of the line is a desired form of lure or bait B having an associated hook (not shown). To facilitate accurate and satisfactory casting, the line weight should be the minimum consistent with strength adequate for the expected catch. Always it is a question whether to use a heavier and stronger line which casts less satisfactorily, or a lighter and weaker line which may break under stress.

With continued use of a casting line it is frequently necessary to break off short lengths adjacent the free end, because of the fact that the major portion of the friction which a line receives in passing through the rod guides, is applied at the very beginning of the cast. That this wear is a definite factor to be reckoned with must be apparent by reference to the diagrammatic figures in the accompanying drawings. Here it will be noted (Fig. 2) that the short piece of line depending from the free end of the rod to carry the bait is required to lag behind the rod through its back stroke as it proceeds to the positions of Figs. 3 and 4, and finally to the extreme point shown in Fig. 5 where the casting stroke is started. The line, that is the short piece of it which projects from the rod, now reverses its position so as to lag behind the rod once more, but on the opposite side, as the rod executes a forward or casting stroke. At some point in this stroke the reel is released to allow the line to run out, as suggested in Fig. 9, at which moment it is required that the inertia of the reel be overcome by the force developed by the line and bait during the cast. While the line is running out, it is sliding through the guides and usually at an angle off the rod end, and so is subject to excessive wear. During the first part of this running-out movement, the reel inertia is greatest. It gradually diminishes until it eventually ceases to drag at all, after which it is braked to prevent back lash. It is during the first part of the running-out movement that the line is subject to the greatest wear, for the reasons noted. Stated another way, it is that portion of the line in the region of its free end, that wears the most, because the remaining portion of the line which is remote from the end does not run through the guides until after the reel inertia has become practically negligible, and when the catch has been drawn in close, as suggested in Fig. 10, it is this same line portion in the region of its free end that again is drawn through the guides, and angularly with respect to one of them, while withstanding the greatest stress—the resistance of the struggling fish plus its weight if lifted from the water. Because the conditions noted are commonly encountered in the use of casting lines, it is quite usual, and in fact almost invariable, for the line to develop greatest weakness in the region of its free end. This necessitates on the part of a careful fisherman attention in the way of breaking off small lengths of line adjacent its end, and an occasional reversal of the line by which to position its opposite end for attachment to the bait.

According to this invention, I fashion the line throughout the major portion $m$ of its length between its two ends of a constant diameter equivalent in strength, let us say, to a 15# line. In the region $e$ of each end, however, for perhaps ten feet or so, the line is formed with a uniform diameter somewhat greater, say equivalent to a 25# line. Connecting each enlarged end portion with the central major portion of the line is a gradually tapering portion $t$ extending through a distance of perhaps two or three feet. These lengths and diameters are suggestive only, and indicate merely in a general way how the line should be formed with a central major portion of a uniform small diameter and other minor portions at the ends of uniform larger diameter with appropriate connecting tapering portions extending through a desired distance.

A line having the characteristics noted has the advantage of combining lightness with increased strength where subject to greatest wear. In use, one of its heavier ends will be required to pass through the rod guides when the line starts to run out, and it will also be this same line portion that receives greatest wear when the catch is brought in. The remaining line portion, that is the major and lighter part of the line intermediate its ends, will be protected almost entirely from any such frictional strain. Because of this circumstance, the line may be depended on to cast easier, and further, to last longer, and hold better. With continued use, the line may be reversed to present its opposite end for attachment to the bait, thereby greatly increasing its serviceable life.

I claim:

1. An improved line for bait casting rods having guides through which the line is threaded, the line having its diameter enlarged in the region of its free end and tapering gradually to a uniform smaller diameter which continues throughout the major portion of its length.

2. An improved line for bait casting rods having guides through which the line is threaded, the major portion of the line intermediate its two ends being of a uniform diameter, other portions of the line adjacent its ends being of a uniform larger diameter, and still other portions intermediately of those having unequal diameters being tapered gradually from one to the other.

3. An improved line for bait casting rods having guides through which the line is threaded, the major portion of the line being of a uniform diameter, another portion adjacents its free end being of a uniform larger diameter, and still another portion intermediately of the two having unequal diameters being tapered gradually from one to the other.

4. As a new article of manufacture, a fishing line having one diameter for the major portion of its length intermediately of its ends, a larger diameter for minor portions of its length adjacent its two ends and spaced from the central major line portion of lesser diameter, and connecting minor portions of gradually tapering diameter intermediately of the others.

CHARLES HEDDON.